United States Patent
Lee et al.

(10) Patent No.: US 8,498,232 B2
(45) Date of Patent: Jul. 30, 2013

(54) METHOD OF TRANSMITTING DATA IN WIRELESS COMMUNICATION SYSTEM

(75) Inventors: Wook Bong Lee, Anyang-si (KR); Ja Ho Koo, Anyang-si (KR); Sung Ho Moon, Anyang-si (KR); Jin Sam Kwak, Anyang-si (KR); Bin Chul Ihm, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 12/810,622

(22) PCT Filed: Dec. 24, 2008

(86) PCT No.: PCT/KR2008/007688
§ 371 (c)(1),
(2), (4) Date: Jun. 25, 2010

(87) PCT Pub. No.: WO2009/084868
PCT Pub. Date: Jul. 9, 2009

(65) Prior Publication Data
US 2010/0278094 A1 Nov. 4, 2010

Related U.S. Application Data

(60) Provisional application No. 61/016,812, filed on Dec. 27, 2007, provisional application No. 61/019,582, filed on Jan. 7, 2008, provisional application No. 61/021,315, filed on Jan. 15, 2008.

(30) Foreign Application Priority Data

Jan. 21, 2008 (KR) ........................ 10-2008-0006320

(51) Int. Cl.
*H04H 20/71* (2008.01)

(52) U.S. Cl.
USPC ........................................... 370/312; 370/432

(58) Field of Classification Search
None
See application file for complete search history.

(56) References Cited

U.S. PATENT DOCUMENTS

| 5,640,196 | A | * | 6/1997 | Behrens et al. | 348/14.02 |
| 7,860,465 | B2 | * | 12/2010 | Cai | 455/101 |
| 8,204,025 | B2 | * | 6/2012 | Cai et al. | 370/337 |
| 2004/0117497 | A1 | * | 6/2004 | Park | 709/230 |
| 2005/0157637 | A1 | * | 7/2005 | Feng et al. | 370/203 |
| 2006/0233534 | A1 | * | 10/2006 | Haupt et al. | 386/112 |

(Continued)

FOREIGN PATENT DOCUMENTS

| EP | 1732272 A1 | 12/2006 |
| KR | 10-2005-0069803 | 7/2005 |
| KR | 10-2007-0042851 | 4/2007 |
| WO | WO 2007/091607 A1 | 8/2007 |

*Primary Examiner* — Bunjob Jaroenchonwanit
(74) *Attorney, Agent, or Firm* — McKenna Long & Aldridge LLP

(57) ABSTRACT

A method of transmitting data in a wireless communication system includes preparing a frame including a unicast subframe for unicast data and an MBS (Multicast and Broadcast Service) subframe for MBS data; and transmitting the unicast data and the MBS data via the frame, wherein the MBS subframe includes an idle time during which data is not carried, and the idle time is arranged to be at the temporally latest position in the MBS subframe. An MBS frame structure for using an appropriate CP with respect to MBS signals transmitted from multi-cell is provided, so an unnecessary idle time can be reduced, and thus, the efficiency of limited radio resources can be improved.

4 Claims, 7 Drawing Sheets

U.S. PATENT DOCUMENTS

| | | | |
|---|---|---|---|
| 2007/0189289 A1* | 8/2007 | Frederiksen et al. | 370/390 |
| 2007/0253360 A1* | 11/2007 | Jalil et al. | 370/328 |
| 2007/0258358 A1* | 11/2007 | Cho et al. | 370/208 |
| 2008/0009319 A1* | 1/2008 | Kim et al. | 455/560 |
| 2008/0043613 A1* | 2/2008 | Yang et al. | 370/208 |
| 2008/0107047 A1* | 5/2008 | Olfat | 370/280 |
| 2008/0175264 A1* | 7/2008 | Qu et al. | 370/436 |
| 2008/0212462 A1* | 9/2008 | Ahn et al. | 370/209 |
| 2009/0004971 A1* | 1/2009 | Dateki et al. | 455/62 |
| 2009/0010196 A1* | 1/2009 | Bui et al. | 370/312 |
| 2009/0034558 A1* | 2/2009 | Mudulodu et al. | 370/512 |
| 2009/0070778 A1* | 3/2009 | Basso et al. | 719/313 |
| 2009/0088148 A1* | 4/2009 | Chung et al. | 455/423 |
| 2009/0116421 A1* | 5/2009 | Kawasaki | 370/312 |
| 2009/0141690 A1* | 6/2009 | Fan et al. | 370/335 |
| 2009/0156225 A1* | 6/2009 | Angelow et al. | 455/450 |
| 2009/0190516 A1* | 7/2009 | Fukuoka et al. | 370/312 |
| 2009/0190570 A1* | 7/2009 | Marath et al. | 370/350 |
| 2009/0296645 A1* | 12/2009 | Bui | 370/329 |
| 2010/0034076 A1* | 2/2010 | Kishiyama et al. | 370/210 |
| 2010/0034301 A1* | 2/2010 | Chang et al. | 375/260 |
| 2010/0150056 A1* | 6/2010 | Iwai et al. | 370/328 |
| 2010/0172278 A1* | 7/2010 | Nishio et al. | 370/312 |
| 2010/0223521 A1* | 9/2010 | Kim et al. | 714/748 |
| 2010/0226290 A1* | 9/2010 | Kwak et al. | 370/278 |
| 2010/0232333 A1* | 9/2010 | Higuchi et al. | 370/312 |
| 2010/0239015 A1* | 9/2010 | Wang et al. | 375/240.16 |
| 2010/0254342 A1* | 10/2010 | Cho et al. | 370/330 |
| 2010/0260164 A1* | 10/2010 | Moon et al. | 370/345 |
| 2010/0322138 A1* | 12/2010 | Buckley et al. | 370/312 |
| 2011/0075621 A1* | 3/2011 | Sung et al. | 370/329 |
| 2011/0134825 A1* | 6/2011 | Kim et al. | 370/312 |
| 2011/0310837 A1* | 12/2011 | Classon et al. | 370/329 |
| 2012/0008579 A1* | 1/2012 | Jalil et al. | 370/329 |

* cited by examiner

METHOD OF TRANSMITTING DATA IN WIRELESS COMMUNICATION SYSTEM

This application is a national phase application based on International Application No. PCT/KR2008/007688, filed on Dec. 24, 2008, which claims priority to U.S. Provisional Application No. 61/016,812, filed on Dec. 27, 2007, U.S. Provisional Application No. 61/019,582, filed on Jan. 7, 2008, U.S. Provisional Application No. 61/021,315, filed on Jan. 15, 2008 and Korean Patent Application No. 10-2008-0006320, filed on Jan. 21, 2008, all of which are incorporated by reference for all purposes as if fully set forth herein.

TECHNICAL FIELD

The present invention relates to wireless communications and, more particularly, to a method for transmitting both unicast data and MBS data.

BACKGROUND ART

IEEE (Institute of Electrical and Electronics Engineers) 802.16 standards provide techniques and protocols to support a broadband wireless access. Standardization proceeded starting from 1999 and IEEE 802.16-2001 was approved in 2001. It is based on a single carrier physical layer called 'WirelessMAN-SC'. Later, besides the 'WirelessMAN-SC', 'WirelessMAN-OFDM' and 'WirelessMAN-OFDMA' were added to the physical layer in IEEE 802.16a standards approved in 2003. After the IEEE 802.16a standards were completed, revised IEEE 802.16-2004 standards were approved in 2004. IEEE 802.16-2004/Cor1 (referred to as 'IEEE 802.16e', hereinafter) was completed in the form of corrigendum in 2005 in order to resolve and correct bugs and errors of the IEEE 802.16-2004 standards.

In general, Multicast and Broadcast Service (MBS) is used in a single frequency network (SFN) to obtain a frequency diversity gain and a macro diversity gain. A plurality of base stations transmit the same MBS signals employing the same Modulation and Coding scheme (MCS), permutation, or the like, to user equipments (UEs). The same MBS signals transmitted from multi-cell do not act as inter-cell interference but act as self-signals to bring about an effect such as multi-path fading. The UEs can obtain an SFN gain such as frequency diversity, macro-diversity, or the like, from the same MBS signals transmitted from the multi-cell.

A delay spread with respect to the MBS signals transmitted from the multi-cell may be considerably increased according to the distance between the base stations and the UEs, compared with a general unicast signal. If the delay spread of the MBS signals is increased to exceed a cyclic prefix (CP), an inter-symbol interference (ISI) is generated. The CP is an interval where no signal is carried to prevent the ISI. Thus, the length of the CP with respect to the MBS signals should be longer than the unicast signal. However, the increase in the length of the CP in the limited radio resources would relatively reduce a resource domain that can carry data. If the inter-site distance (ISD) is long, the delay spread with respect to the MBS signals would be increased, so, preferably, the length of the CP is increased, while if the ISD is short, the length of the CP is preferably reduced.

However, a frame that may accept such CPs having various lengths and being possibly applicable to the MBS signals has not been explicitly presented yet.

DISCLOSURE OF INVENTION

Technical Problem

The present invention provides a method for transmitting unicast data and MBS data.

Technical Solution

도6설명이후, FDD 도 가능하다. In an aspect, a method of transmitting data in a wireless communication system includes preparing a frame including a unicast subframe for unicast data and an MBS (Multicast and Broadcast Service) subframe for MBS data, and transmitting the unicast data and the MBS data via the frame, wherein the MBS subframe includes an idle time during which data is not carried, and the idle time is arranged to be at the temporally last position in the MBS subframe.

In another aspect, a method of transmitting data using a frame including radio resources of a time domain and a frequency domain includes transmitting data having a first cyclic prefix (CP) via a first region of the frame, and transmitting data having a second CP via a second region temporally subsequent to the first region, wherein the first and second CPs have different lengths and the second region includes an idle time during which data is not carried.

ADVANTAGEOUS EFFECTS

An MBS frame structure for using an appropriate CP with respect to MBS signals transmitted from multi-cell is provided, so an unnecessary idle time can be reduced, and thus, the efficiency of limited radio resources can be improved.

MODE FOR THE INVENTION

Figure 1:
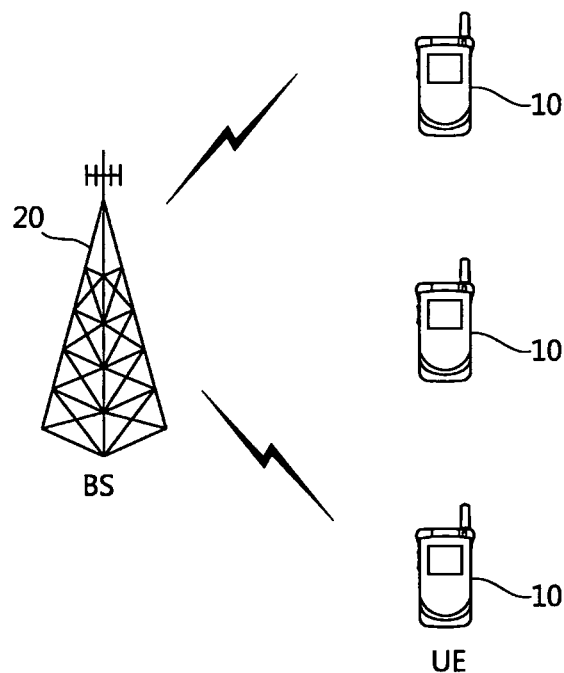
FIG. 1 shows a wireless communication system.

FIG. 1 shows a wireless communication system. The wireless communication system is widely deployed to provide a variety of communication services, such as voices, packet data, etc.

Referring to FIG. 1, the wireless communication system includes a base station (BS) 20 and user equipments (UEs)) 10. The UEs 10 may be fixed or have mobility, and may be referred to as another terminology, such as a mobile station (MS), a user terminal (UT), a subscriber station (SS), a wireless device, etc. The BS 20 generally refers to a fixed station that communicates with the UEs 10 and may be called another terminology, such as a node-B, a base transceiver system (BTS), an access point, etc. One or more cells may exist within the coverage of the BS 20.

Hereinafter, downlink refers to communication link from the BS 20 to the UEs 10, and uplink refers to communication link from the UEs 10 to the BS 20. In the downlink, a transmitter may be a part of the BS 20, and a receiver may be a part of the UEs 10. In the uplink, a transmitter may be a part of the UEs 10, and a receiver may be a part of the BS 20.

The wireless communication system may be an OFDM (Orthogonal Frequency Division Multiplexing)/OFDMA (Orthogonal Frequency Division Multiple Access)-based system. The OFDM uses orthogonality characteristics between IFFT (Inverse Fast Fourier Transform) and FFT (Fast Fourier Transform). The transmitter performs IFFT on data and transmits the same. The receiver performs FFT on received data to restore the original data. The transmitter uses IFFT to combine multiple subcarriers, and the receiver uses corresponding FFT to split the multiple subcarriers.

Figure 2:
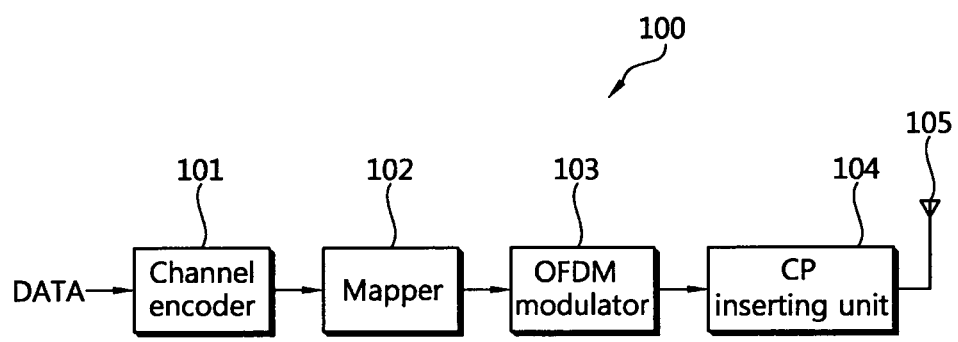
FIG. 2 is a schematic block diagram showing an example of a transmitter.

FIG. 2 is a schematic block diagram showing an example of a transmitter.

Referring to FIG. 2, the transmitter includes a channel encoder 101, a mapper 102, an OFDM modulator 103, and a CP inserting unit 104.

The channel encoder 101 encodes input data according to a determined coding scheme to form coded data. The mapper 102 modulates the coded data according to a determined modulation scheme and maps the modulated data to symbols expressing positions according to amplitude and phase constellation. The OFDM modulator 103 modulates input symbols into OFDM symbols. The OFDM modulator 103 may perform IFFT on the input symbols to convert them into time domain samples.

The CP inserting unit 104 adds CPs to the converted time domain samples. The CP inserting unit 104 may insert the CPs such that a CP inserted to unicast data and a CP inserted to MBS (Multicast and Broadcast Service) data have different lengths. The CP inserting unit 104 may use CPs of various lengths according to cell radiuses. The CP-inserted time domain samples are transmitted via an antenna 105.

The receiver removes the CP from a reception signal, performs FFT on the corresponding signal, and performs a reverse process of the process performed by the mapper 102 and the channel encoder 101.

Figure 3:
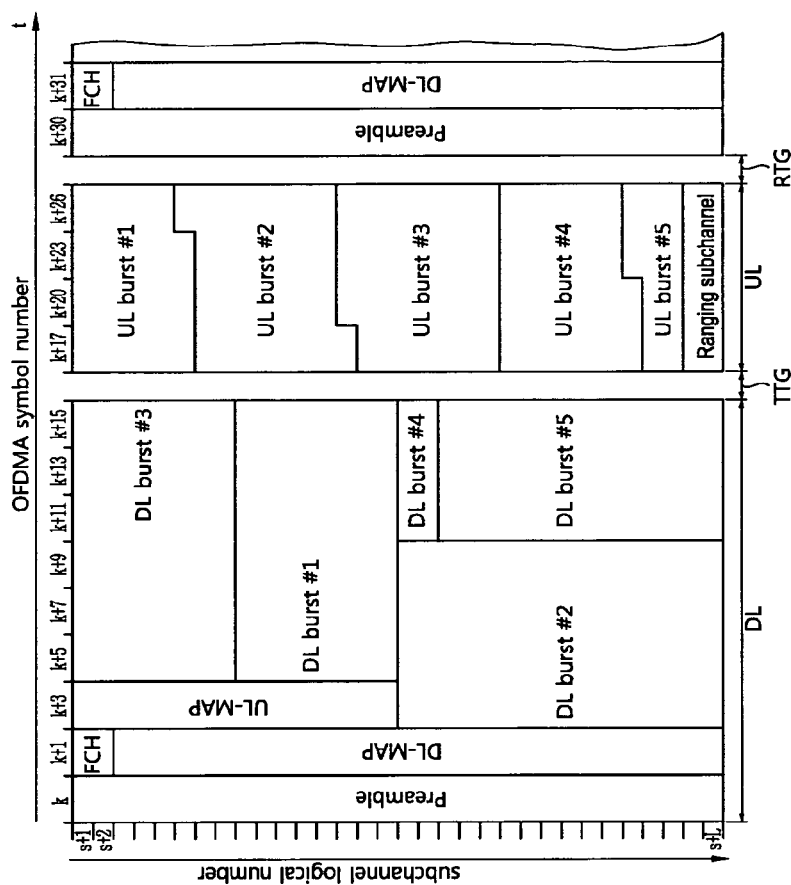
FIG. 3 is a block diagram showing an example of a frame structure.

FIG. 3 is a block diagram showing an example of a frame structure. The frame is a data sequence during a fixed time period used by physical specifications. It may refer to the paragraph 8.4.4.2 of "Part 16: Air Interface for Fixed Broadband Wireless Access Systems" of IEEE standards 802.16-2004 (referred to as 'Reference document 1', hereinafter).

Referring to FIG. 3, the frame includes a downlink frame and an uplink frame. Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL (Downlink)-MAP, a UL (Uplink)-MAP, burst regions, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between a downlink burst and a subsequent uplink burst. A receive/transmit transition gap (RTG) refers to a gap between the uplink burst and a subsequent downlink burst.

The preamble is used for initial synchronization between a base station and a UE, cell search, frequency offset, and channel estimation. The FCH includes the length of a DL-MAP message and coding information of the DL-MAP message.

The DL-MAP is a region on which the DL-MAP message is transmitted. The DL-MAP message defines an access of a downlink channel. The DL-MAP message includes a configuration change count of a DCD (Downlink Channel Descriptor) and a base station ID (Identifier). The DCD describes a downlink burst profile applied to a current map. The downlink burst profile refers to the characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a UCD (Uplink Channel Descriptor) and a valid start time of uplink allocation defined by the UL-MAP. The UCD describes an uplink burst profile. The uplink burst profile refers to the characteristics of an uplink physical channel, and the UCD is periodically transmitted by the base station via a UCD message.

Hereinafter, a slot is a minimum available data allocation unit and defined as time and a subchannel. The number of subchannels depends upon the size of FFT and time-frequency mapping. Subchannels include a plurality of subcarriers. The number of subcarriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps. In a first step, data is mapped to at least one data slot in at least one logical subchannel. In a second step, each logical subchannel is mapped to physical subcarriers. This is called permutation. Reference document 1 discloses permutations such as FUSC, PUSC, O-FUSC (Optional-FUSC), O-PUSC (Optional-PUSC), AMC (Adaptive Modulation and Coding), or the like. A set of OFDM symbols using the same permutation is called a permutation zone, and a single frame includes at least one permutation zone.

The FUSC and the O-FUSC are used only for downlink transmission. The FUSC includes a single segment including every subchannel group. Each subchannel is mapped to a physical subcarrier distributed in the entire physical channels. This mapping changes for each OFDM symbol. A slot includes a single subchannel in a single OFDM symbol. The O-FUSC has a different pilot allocation method from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, the subcarriers may be divided into tiles including four contiguous physical subcarriers on three OFDM symbols. Each subchannel includes six tiles. Pilots are allocated to the edge of each tiles. The O-PUSC is used only for uplink transmission, and each tile includes three continuous physical subcarriers on three OFDM symbols. Pilot is allocated to the center of tiles.

Figure 4:
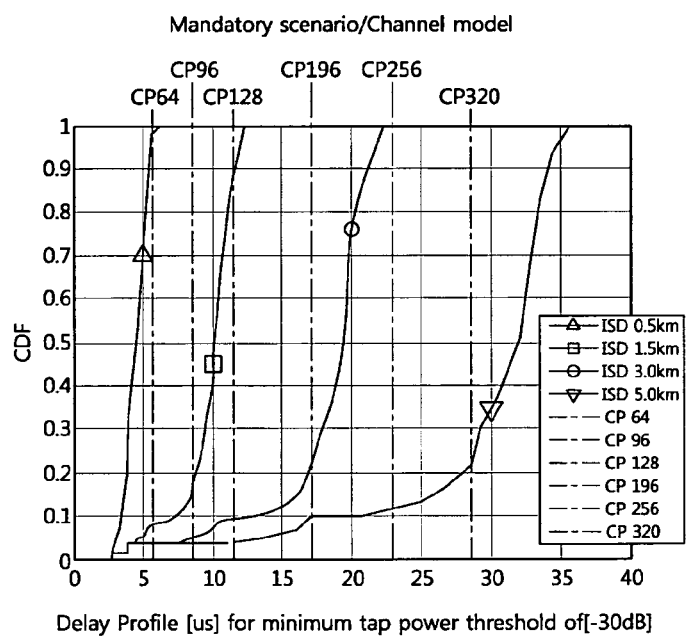
FIG. 4 is a graph showing a cumulative distribution function (CDF) with respect to data transmission by inter-site distance (ISD).

FIG. 4 is a graph showing a cumulative distribution function (CDF) with respect to data transmission by inter-site distance (ISD).

Referring to FIG. 4, it is noted that if the ISD is 0.5 km, most data are transmitted within 64 CPs. Also, it is noted that if the ISD is 1.5 km, most data are transmitted within 128 CPs. However, it is noted that, in a large cell with the ISD of 3.0 km or 5.0 km, data is transmitted in much excess of 128 CPs.

Figure 5:
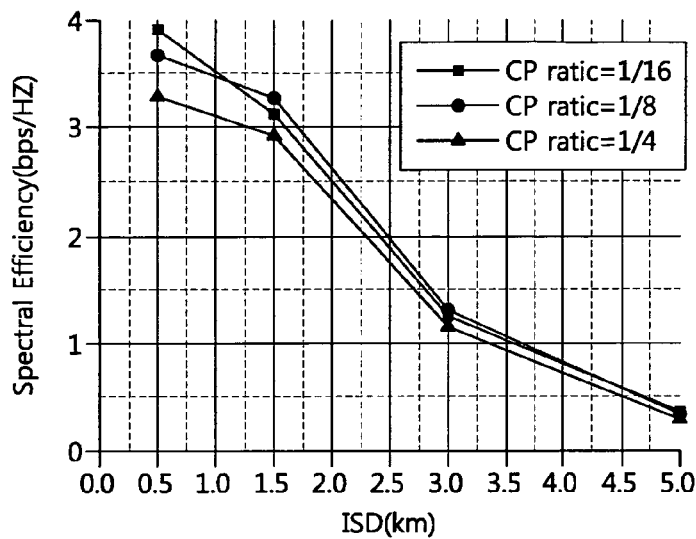
FIG. 5 is a graph showing a spectral efficiency of each ISD by CP ratios.

FIG. 5 is a graph showing a spectral efficiency of each ISD by CP ratios.

Referring to FIG. 5, CP ratios refer to the length or duration of CPs. When the ISD is 0.5 km, the best spectral efficiency is obtained when the CP ratio is 1/16. When the ISD is 1.5 km, the best spectral efficiency is obtained when the CP ratio is 1/8. Namely, it is noted that a CP of a small size is preferably used in a quite small cell (ISD is 0.5 km), while a CP (CP ratio is 1/8) of a middle size is preferably used.

An MBS frame will be described as follows. An MBS frame refers to a frame that can include both unicast data and MBS data and transmit the same. In determining an MBS frame structure, a general frame structure only for unicast data should be considered. The length of a CP applied for unicast data and that of a CP applied for MBS data may be determined to be different, and in this case, if the frame structure for the unicast data is not considered, the MBS frame may have a long idle time during which data is not carried.

Figure 6:
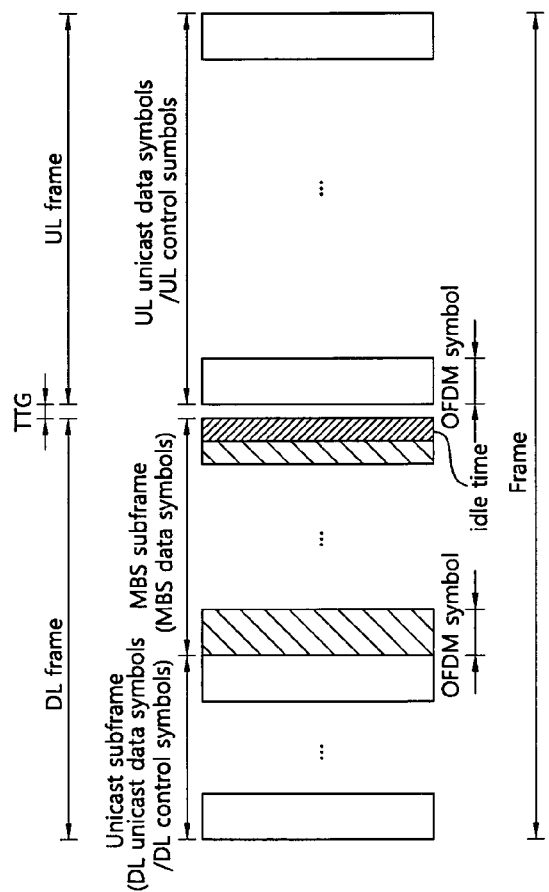
FIG. 6 is a view shaving an MBS frame structure according to an embodiment of the present invention.

FIG. 6 is a view shaving an MBS frame structure according to an embodiment of the present invention.

Referring to FIG. 6, the MBS frame includes a downlink (DL) frame and an uplink (UL) frame, and the DL frame includes a unicast subframe and an MBS subframe. The MBS subframe may temporally follow the unicast subframe. The MBS subframe may be disposed at the temporally latest position in the DL frame. This is merely illustrative, and the MBS subframe may be disposed at an arbitrary position in the DL frame. The position information of the MBS subframe may be indicated via a DL-MAP message or an MBS-MAP message for the MBS subframe. When the MBS subframe is disposed at the temporally latest position in the DL frame, the position information of the MBS subframe may be expressed with an OFDM symbol index from which the MBS subframe starts. In addition, the MBS frame may be discriminated into various subframes, and each discriminated subframe may be assigned a subframe index. In this case, the position information of the MBS subframes may be expressed with a subframe index from which each MBS subframe starts. When a plurality of MBS subframes are disposed at the temporarily latest positions in the DL frame, the position of the MBS subframes may be expressed by the number of the MBS frames.

The unicast subframe includes DL unicast data and control signal. The MBS subframe includes one or more MBS data symbols. The DL unicast data symbols, the DL control symbols and the MBS data symbols correspond to OFDM symbols. OFDM symbols of the unicast subframe may be called OFDM symbols, and the OFDM symbols of the MBS subframe may be called MBS OFDM symbols. In order to transmit MBS data, some of a plurality of OFDM symbols included in the DL frame may be used as the MBS subframe. Namely, the MBS subframe include one or more OFDM symbols. In other words, in order to transmit MBS data, some of the DL unicast data symbols may be used for the MBS data symbols.

Hereinafter, the CPs included in the unicast subframe are referred to as unicast CPs, CPs included in the MBS subframe are referred to as MBS CPs, and a radio of the CP length to the duration of the OFDM symbols is referred to as a CP ratio. The CP ratio refers to the length or duration of CPs. A CP ratio of the unicast CPs is referred to as a unicast CP ratio, and a CP ration of MBS CPs is referred to as an MBS CP ratio.

In setting the interval (length or duration) of the MBS CPs, at least two following conditions should be considered: (1) The length of the MBS CPs should be so long as to reduce an inter-symbol interference (ISI) and sufficiently obtain a single frequency network (SFN) gain; (2) The MBS subframe structure should be consistent with the unicast subframe structure. If the unicast CPs and the MBS CPs are set to have different lengths, the duration of the MBS subframe and that of the unicast subframe may not be the same, generating an idle time as long as the difference of the duration. The idle time is an interval during which no signal is transmitted, causing a waste of radio resources, which, thus, should be considered in setting the length of the MBS CPs.

The idle time may be disposed at the temporally last position in the MBS subframe. Namely, the idle time may be positioned next the last MBS data symbol of the MBS subframe. When the MBS subframe temporally follows the unicast frame, the idle time may be disposed at the temporally latest position in the DL frame. The idle time may temporally go ahead of and be contiguous to the TTG between the DL frame and the UL frame. This is merely illustrative, and the idle time may be positioned ahead of the first MBS data symbol in the MBS subframe.

Here, it is assumed that the duration of the MBS frame is 5 ms and the unicast CPs and the MBS CPs have 1/8 CP ratio. If the duration of the OFDM symbols is 102.86 µs, the lengths of the unicast CPs and the MBS CPs are 11.44 µs. The MBS subframe structure can be configured to be consistent with the unicast subframe structure by applying such CP length, and unicast data and MBS data can be transmitted via a single MBS frame even in a multi-cell environment having a large cell radius. The unicast CPs and the MBS CPs may have a 1/8 CP ratio in the MBS frame with respect to the large cell.

In this respect, however, the 1/8 CP ratio may be a too large CP length in transmission of unicast data, so the unicast CP ratio needs to be reduced.

The idle time that may be generated in the MBS frame according to a change in the CP ratio and the spectral efficiency using the MBS frame will now be described.

Although the MBS frame structure shown in FIG. 6 is a TDD frame, this is exemplary purpose only. The MBS frame may be a frequency division duplex (FDD) frame in which downlink subframes and uplink subframes use different frequency bands.

Figure 7:
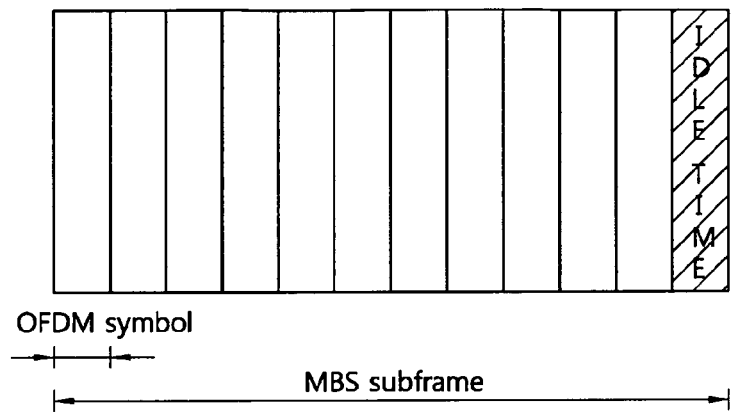
FIG. 7 is a view shaving an MBS subframe structure according to one embodiment of the present invention.
Figure 8:
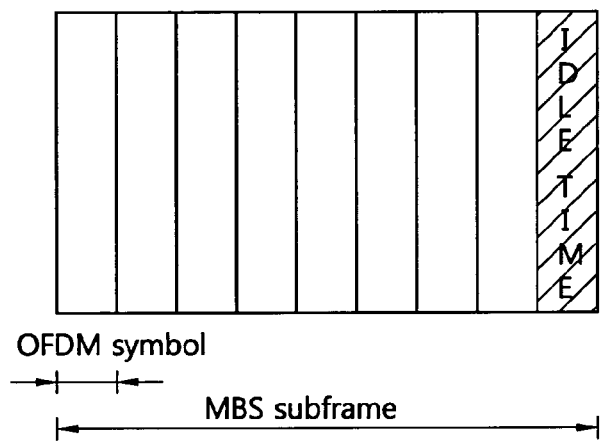
FIG. 8 is a view shaving an MBS subframe structure according to another embodiment of the present invention.

FIG. 7 is a view shaving an MBS subframe structure according to one embodiment of the present invention. FIG. 8 is a view shaving an MBS subframe structure according to another embodiment of the present invention. When the unicast CP ratio is set as 1/12, the number of the MBS OFDM symbols of the MBS subframe is 11 in the case as shown in FIG. 7, and that of the MBS OFDM symbols of the MBS subframe is 8 in the case as shown in FIG. 8.

Referring to FIGS. 7 and 8, the unicast CP may be used as the MBS CP by changing the length of the unicast CP. Namely, the unicast CP ratio and the MBS CP ratio may be set to be different. The ratio of the MBS CPs may be set to be higher than that of the unicast CPs.

For example, the unicast CP ratio may be set as 1/12, while the MBS CP ratio may be set to be higher than that of the unicast CP ratio. Table 1 shows the MBS subframe when the unicast CP ratio is set as 1/12.

TABLE 1

| | Unicast CP ratio | Number of unicast OFDM symbols per MBS subframe | MBS CP length/ MBS CP ratio | Number of MBS OFDM symbols per MBS subframe | Idle time |
|---|---|---|---|---|---|
| Case A | 1/12 | 12 | 16.43 μs(23/128) | 11 | 1.79 μs |
| Case B | 1/12 | 9 | 19.82 μs(111/512) | 8 | 1.16 μs |
| Case C | 1/12 | N | 7.619 μs(1/12) | N | 0 μs |

In the 'Case A' (See FIG. 7, the MBS subframe includes 11 MBS OFDM symbols.

When the duration of the MBS subframe is 1188.2p, the number of unicast OFDM symbols with respect to the MBS subframe is 12. If the length of the MBS CP is 16.43 μs, namely, if the MBS CP ratio is 23/128, the MBS subframe includes 11 MBS OFDM symbols and the idle time is 1.79 μs.

In the 'Case B' (See FIG. 8), the MBS subframe includes 8 MBS OFDM symbols. When the duration of the MBS subframe is 891.16p, the number of unicast OFDM symbols with respect to the MBS subframe is 9. If the length of the MBS CP is 19.82 μs, namely, if the MBS CP ratio is 111/512, the MBS subframe includes eight MBS OFDM symbols and the idle time is 1.16 μs.

In the 'Case C', the unicast CP ratio and the MBS CP ratio are all set as 1/12. The length of the MBS CPs is 7.619 μs, the number of unicast OFDM symbols and that of the MBS OFDM symbols with respect to the MBS subframe are the same as 'N', and the idle time is 0 μs.

In the Case A and Case B, the idle time generated as the unicast CP ratio and the MBS CP ratio are different may be disposed at the temporally latest position in the MBS subframe.

Figure 9:
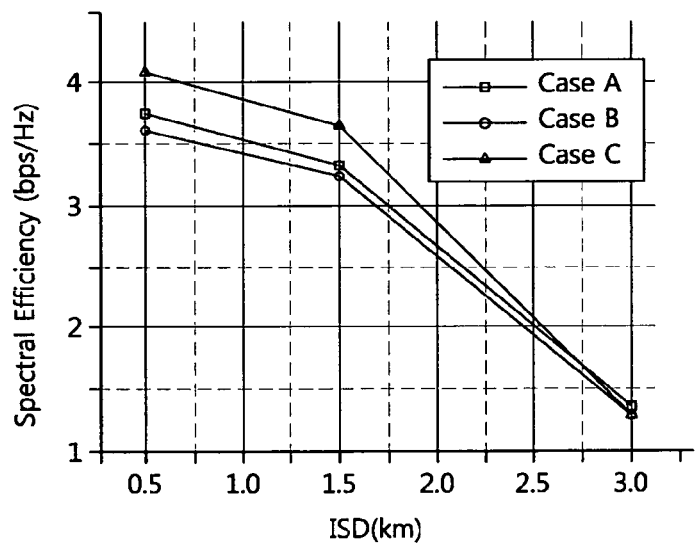
FIG. 9 is a graph showing the results obtained by performing MBS by using the MBS subframe.

FIG. 9 is a graph showing the results obtained by performing MBS by using the MBS subframe.

Referring to FIG. 9, there are shown the spectral efficiencies with respect to the ISD when the MBS subframe according to the Case A, B, and C in Table 1 is used. It is noted that the Case C has the best spectral efficiency. Namely, a CP having a CP ratio of 1/12 may be well used as the MBS CP. In the MBS frame, the unicast CPs and the MBS CPs may have the 1/12 CP ratio.

Figure 10:
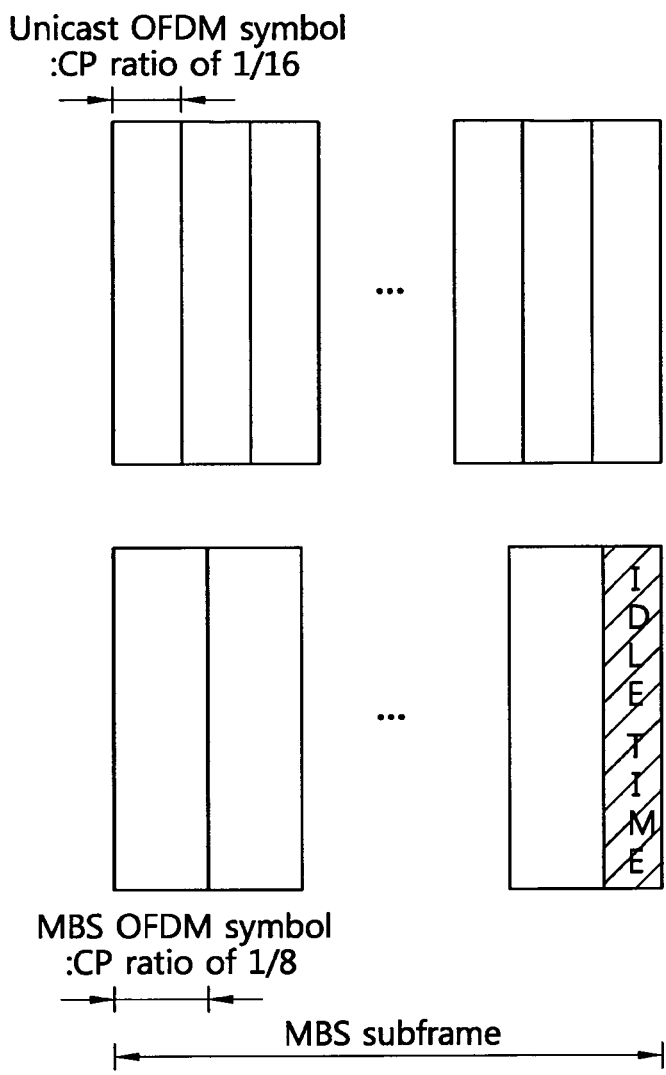
FIG. 10 is a view shaving a unicast subframe and an MBS subframe each having a different CP ratio according to one embodiment of the present invention.

FIG. 10 is a view shaving a unicast subframe and an MBS subframe each having a different CP ratio according to one embodiment of the present invention.

Referring to FIG. 10, the unicast subframe uses a 1/16 CP ratio, and the MBS subframe uses a 1/8 CP ratio. If the number of unicast OFDM symbols of the MBS subframe is 'N' (10<N≦18), the MBS subframe includes the (N-1) number of MBS OFDM symbols. The idle time of the MBS subframe may be obtained by equation 1 shown below:

MathFigure 1

$$T_{idle} = N_{FFT} \times (1+G_{MBS})/F_s - N_{FFT} \times (G_{MBS}-G_{uni})/F_s \times N \quad \text{[Math.1]}$$

wherein $T_{idle}$ is an idle time, $N_{FFT}$ is the size of FFT (Fast Fourier Transform), $G_{MBS}$ is an MBS CP ratio, $G_{uni}$ is a unicast CP ratio, and $F_s$ is a sampling frequency. If the number of unicast OFDM symbols is within the range of 18<N≦36, the MBS subframe includes the (N-2) number of MBS OFDM symbols and the idle time of the MBS subframe can be obtained by equation 2 shown below:

MathFigure 2

$$T_{idle} = K \times N_{FFT} \times (1+G_{MBS})/F_s - N_{FFT} \times (G_{MBS}-G_{Uni})/F_s \times N \quad \text{[Math.2]}$$

If the number of OFDM symbols borrowed to extend the CPs is 'K', Equation (1) and Equation (2) may be expressed by Equation 3 shown below:

MathFigure 3

$$T_{idle} = K \times N_{FFT} \times (1+G_{MBS})/F_s - N_{FFT} \times (G_{MBS}-G_{uni})/F_s \times N \quad \text{[Math.3]}$$

Equation 3 may be applied for every CP length. In particular, when the unicast CP ratio is 1/16 and the MBS CP ratio is 1/8, 'K'=ceil(N/18) may be applicable.

The idle time generated when the unicast CP ratio and the MBS CP ratio are set to be different may be disposed at the temporally latest position in the MBS subframe. When the MBS subframe temporally follows the unicast subframe, the idle time may be disposed at the temporally latest position in the DL frame.

Figure 11:
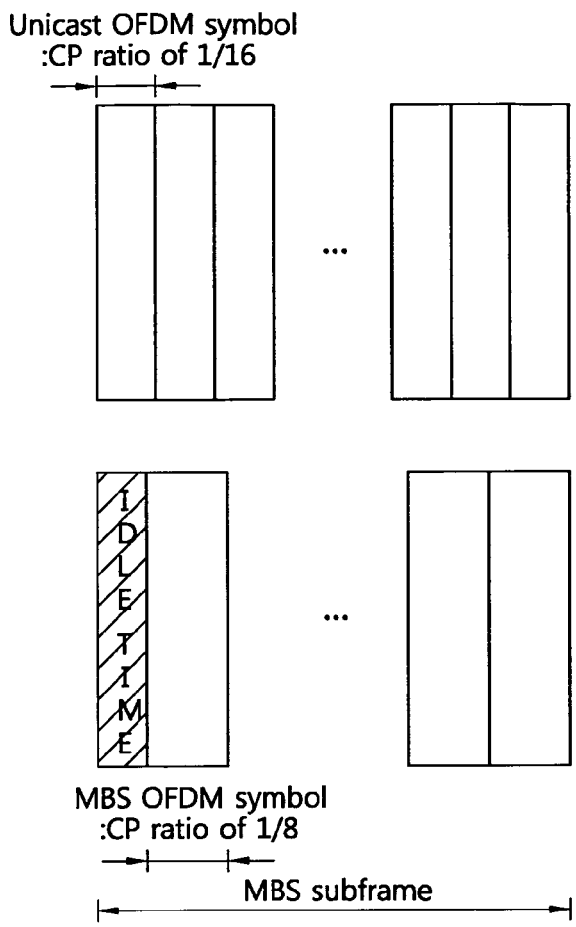
FIG. 11 is a view shaving a unicast subframe and an MBS subframe each having a different CP ratio according to another embodiment of the present invention.

FIG. 11 is a view shaving a unicast subframe and an MBS subframe each having a different CP ratio according to another embodiment of the present invention.

Referring to FIG. 11, the unicast subframe uses the 1/16 CP ratio, and the MBS subframe uses the 1/8 CP ratio. The idle time is disposed at the temporally forefront position in the MBS subframe. When the MBS subframe temporally follows the unicast subframe, the idle time may be positioned between the unicast subframe and the MBS subframe. In this case, the idle time may indicate starting of the MBS subframe, and the UE may recognize the start of the MBS frame from the idle time.

Figure 12:
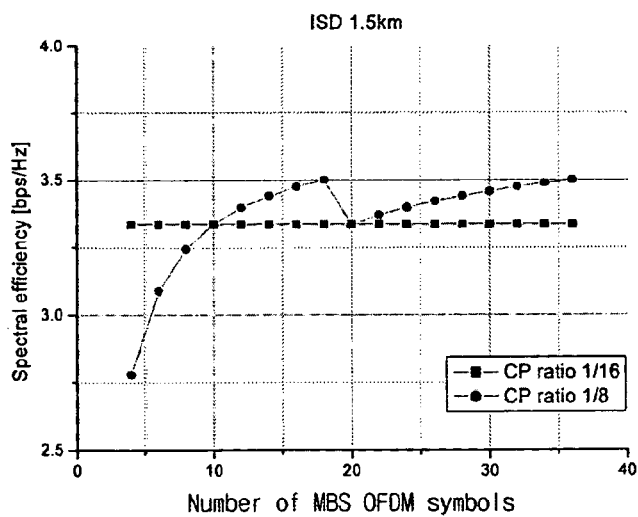
FIG. 12 is a graph showing one example of results obtained by performing MBS according to CP ratios.

FIG. 12 is a graph showing one example of results obtained by performing MBS according to CP ratios.

Referring to FIG. 12, there are shown the results obtained by performing MBS in case where the CP ratio is 1/16 and in case where the CP ratio is 1/8 when the ISD is 1.5 km. When the CP ratio is 1/16, uniform spectral efficiency is obtained, and when the CP ratio is 1/8, the spectral efficiency is substantially increased according as the number of MBS OFDM symbols is increased.

It is noted that when the number of MBS OFDM symbols included in the MBS subframe is 10 or smaller, the use of the 1/16 CP ratio achieves good results in terms of spectral efficiency, and when the number of MBS OFDM symbols is larger than 10, the use of the 1/8 CP ratio achieves good results in terms of spectral efficiency.

Figure 13:
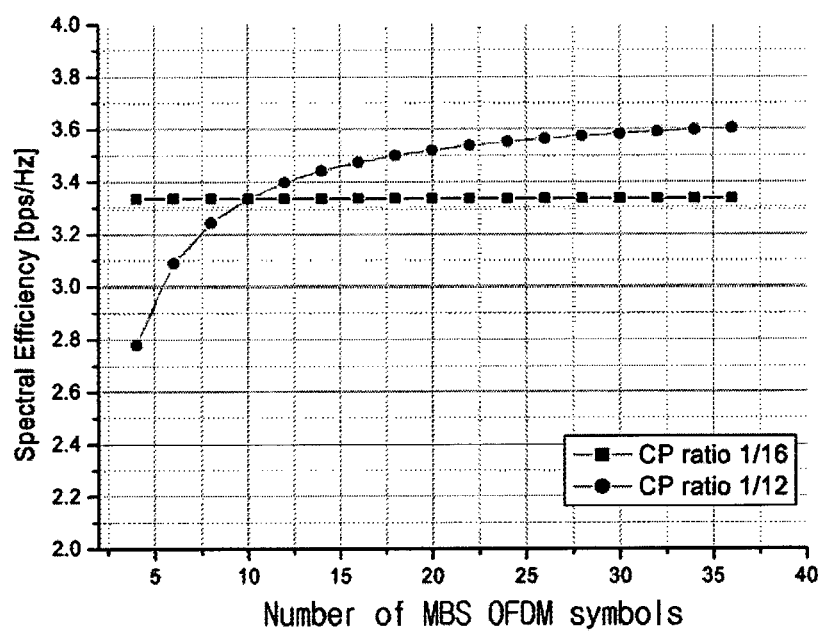
FIG. 13 is a graph showing another example of results obtained by performing MBS according to CP ratios.

FIG. 13 is a graph showing another example of results obtained by performing MBS according to CP ratios.

Referring to FIG. 13, there are shown the results obtained by performing MBS in case where the CP ratio is 1/16 and in case where the CP ratio is 1/12 when the ISD is 1.5 km.

It is noted that when the number of MBS OFDM symbols included in the MBS subframe is 10 or smaller, the use of the 1/16 CP ratio achieves good results in terms of spectral efficiency, and when the number of MBS OFDM symbols is larger than 10, the use of the 1/12 CP ratio achieves good results in terms of spectral efficiency.

Table 2 shows one example of various unicast CP ratios and MBS CP ratios that can be applied for the MBS frame.

TABLE 2

| Unicast CP ratio | MBS CP size option/CP ratio (G)(Cell size) | Number of unicast OFDM symbols per MBS subframe | Number of MBS OFDM symbols per MBS subframe | Idle time |
|---|---|---|---|---|
| $G_{uni} = 1/8$ | 11.43 μs ($G_{MBS} = 1/8$) (Small to large) | N | N | 0 μs |
| $G_{uni} = 1/12$ | 7.619 μs ($G_{MBS} = 1/12$) (Small to large) | N | N | 0 μs |
| $G_{uni} = 1/16$ | 5.71 μs ($G_{MBS} = 1/16$) (Small) | N | N | 0 μs |
| $G_{uni} = 1/16$ | 5.71 μs ($G_{MBS} = 1/16$) (Medium to large, short subframe size: ex) N <= 10) | N | N | 0 μs |
| $G_{uni} = 1/16$ | 11.43 μs ($G_{MBS} = 1/8$) (Medium to large, medium subframe size: ex) 10 < N <= 18) | N | N − 1 | $N_{FFT}*(1 + G_{MBS})/F_s - N_{FFT}*(G_{MBS} - G_{uni})/F_s*N$ s |
| $G_{uni} = 1/16$ | 11.43 μs ($G_{MBS} = 1/8$)(Medium to large, long subframe size: ex) 18 < N <= 36) | N | N − 2 | $2*N_{FFT}*(1 + G_{MBS})/F_s - N_{FFT}*(G_{MBS} - G_{uni})/F_s*N$ s |

The unicast CP ratio ($G_{uni}$) 1/8 and the MBS CP ratio ($G_{MBS}$) 1/8 can be applicable for both a small cell radius and a large cell radius. The unicast CP ratio 1/12 and the MBS CP ratio 1/12 can be also applicable for both a small cell radius and a large cell radius. The unicast CP ratio 1/16 and MBS CP ratio 1/16 can be applicable for a small cell radius. Or, in case of an MBS subframe with a small size (short subframe size) including 10 or smaller MBS OFDM symbols, the unicast CP ratio 1/16 and the MBS CP ratio 1/16 can be applicable for a middle cell radius to the large cell radius. In case of an MBS subframe with a medium size (medium subframe size) having the N (10<N≦18) number of MBS OFDM symbols, the unicast CP ratio 1/16 and the MBS CP ratio 1/8 may be applicable for the middle cell radius to the large cell radius. In case of an MBS subframe with a large size (long subframe size) including the N (18<N<38) number of MBS OFDM symbols, the unicast CP ratio 1/16 and the MBS CP ratio 1/8 may be applicable for the middle cell radius to the large cell radius.

Table 3 shows another example of various unicast CP ratios and MBS CP ratios that can be applied for the MBS frame.

TABLE 3

| Unicast CP ratio | MBS CP size option/CP ratio (G)(Cell size) | Number of unicast OFDM symbols per MBS subframe | Number of MBS OFDM symbols per MBS subframe | Idle time |
|---|---|---|---|---|
| $G_{uni} = 1/8$ | 11.43 μs ($G_{MBS} = 1/8$) (Small to large) | N | N | 0 μs |
| $G_{uni} = 1/12$ | 7.619 μs ($G_{MBS} = 1/12$) (Small to large) | N | N | 0 μs |
| $G_{uni} = 1/16$ | 5.71 μs ($G_{MBS} = 1/16$) (Small) | N | N | 0 μs |
| $G_{uni} = 1/16$ | 5.71 μs ($G_{MBS} = 1/16$) (Medium to large, short subframe size: ex) N <= 10) | N | N | 0 μs |
| $G_{uni} = 1/16$ | 7.619 μs ($G_{MBS} = 1/12$) (Medium to large, medium to large subframe size: ex) N < 10) | N | N − 1 | $N_{FFT}*(1 + G_{MBS})/F_s - N_{FFT}*(G_{MBS} - G_{uni})/F_s*N$ s |
| $G_{uni} = 1/24$ | 3.81 μs ($G_{MBS} = 1/24$) (Small to any N and Medium to large with short subframe size: ex) N <= 10) | N | N | 0 μs |

TABLE 3-continued

| Unicast CP ratio | MBS CP size option/CP ratio (G)(Cell size) | Number of unicast OFDM symbols per MBS subframe | Number of MBS OFDM symbols per MBS subframe | Idle time |
|---|---|---|---|---|
| $G_{uni} = 1/24$ | 7.619 μs ($G_{MBS} = 1/12$)(Medium to large, Medium to large subframe size: ex) N <= 26) | N | N − 2 | $N_{FFT}*(1 + G_{MBS})/F_s - N_{FFT}*(G_{MBS} - G_{uni})/F_s*N$ s |

With respect to the MBS subframe having the N (N<10) number of MBS OFDM symbols, the unicast CP ratio 1/16 and the MBS CP ratio 1/12 can be applicable for the medium cell radius to large cell radius. The unicast CP ratio 1/24 and the MBS CP ratio 1/24 can be applicable for the small cell radius regardless of the N number of MBS OFDM symbols, and also can be applicable for the medium cell radius and the large cell radium with respect to the MBS subframe including the N (N<10) number of MBS OFDM symbols. With respect to the MBS subframe having the N (N<26) number of MBS OFDM symbols, the unicast CP ratio 1/24 and the MBS CP ratio 1/24 can be applicable for the medium cell radius to the large cell radius.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting data in a wireless communication system, the method including:
preparing a frame including a unicast subframe for unicast data with respect to a single user and an MBS (Multicast and Broadcast Service) subframe for MBS data with respect to multiple users, a length of an MBS cyclic prefix (CP) inserted into the MBS subframe being longer than a length of a unicast CP inserted into the unicast subframe, and a number of unicast orthogonal frequency division multiplexing (OFDM) symbols in the unicast subframe being more than a number of MBS OFDM symbols in the MBS subframe; and
transmitting the unicast data and the MBS data via the frame,
wherein the MBS subframe comprises an idle time during which data is not carried, and the idle time is disposed at the temporally latest position in the MBS subframe,
wherein the position of the MBS subframe is indicated by an OFDM symbol index from which the MBS subframe starts, and
the idle time is obtained by the Equation as follows:

$$T_{idle} = K \times N_{FFT} \times (1+G_{MBS})/F_s - N_{FFT} \times (G_{MBS} - G_{uni})/F_s \times N,$$

where $T_{idle}$ is the idle time, K=ceil(N/18), $N_{FFT}$ is a size of fast Fourier transform (FFT), $G_{MBS}$ is a ratio of the length of the MBS CP to a length of an OFDM symbol, $G_{uni}$ is a ratio of the length of the unicast CP to the length of the OFDM symbol, $F_s$ is a sampling frequency, and N is the number of unicast OFDM symbols.

2. The method of claim 1, wherein the MBS subframe temporally follows the unicast subframe.

3. The method of claim 1, wherein the frame comprises a downlink frame and an uplink frame, and the idle time is disposed at the temporally latest position in the downlink frame.

4. The method of claim 1, wherein position of the MBS subframes is indicated by the number of MBS subframes.

* * * * *